May 27, 1969 S. L. SCHECTER 3,446,460

JET AND ROCKET ENGINE POWERED AIR-BORNE VEHICLES

Filed Dec. 23, 1966 Sheet 1 of 7

INVENTOR.
STEVEN L. SCHECTER

BY
J. B. Felshin
ATTORNEY.

May 27, 1969        S. L. SCHECTER        3,446,460

JET AND ROCKET ENGINE POWERED AIR-BORNE VEHICLES

Filed Dec. 23, 1966        Sheet 3 of 7

INVENTOR.
STEVEN L. SCHECTER

BY

*J. B. Feldman*

ATTORNEY

INVENTOR
STEVEN L. SCHECTER

BY
*J. B. Felshin*
ATTORNEY

United States Patent Office 3,446,460
Patented May 27, 1969

3,446,460
JET AND ROCKET ENGINE POWERED AIR-BORNE VEHICLES
Steven L. Schecter, 15 Rue Raynouard,
Paris XVIe, France
Filed Dec. 23, 1966, Ser. No. 604,367
Int. Cl. B64c *15/06;* B64d *27/20*
U.S. Cl. 244—52                                        15 Claims

ABSTRACT OF THE DISCLOSURE

This invention concerns a device for the controlled ducting of the exhaust gases from an aircraft jet or rocket engine. By the use of this device, the exhaust gases and thrust forces can be directed in a downwardly fore, aft, right or left or rearwardly direction, either singly or in combination. In addition, partitions and passageways are provided to control the gas flow to the proper outlets, and an improved means is included to prevent exhaust gas leakage outside of the vehicle prior to reaching the proper outlets.

---

This invention relates to jet and rocket engine powered airborne vehicles. It is particularly directed to means for changing vertical takeoff and landing of such vehicles to straight and level flight.

An object of this invention is to provide highly improved apparatus of the character described suitable for single engine aircraft to provide for deflecting exhaust from the engine either downward, left and right forward, as well as downward aft, to establish three thrust points for a one engine aircraft, and which may be adjusted to allow the exhaust to leave the aircraft straight rearwardly only.

Another object of this invention is to provide apparatus of the character described which may be adjusted to deflect exhaust from the engine downwardly to only one or two thrust points aft of the engine. A device deflecting exhaust downwardly to two thrust points aft of the engine, would have to be provided each engine of a twin engine aircraft. A device deflecting exhaust downwardly to only one thrust point aft of the engine, would have to be provided each engine of a three-or-more-engine aircraft.

Yet another object of this invention is to provide in apparatus of the character described, means to apportion the relative right fore left fore thrusts.

Yet a further object of this invention is to provide an apparatus of the character described, in which the ducts for exhaust gases deflected downwardly left and right fore, are provided with partitions to divide said ducts into a number of passageways, and means to control passage of exhaust gases to selected passageways.

Yet another object of this invention is to provide in an apparatus of the character described, highly improved means to prevent leakage or seepage of exhaust gases to the outside of the vehicle prior to reaching the outlets for said exhaust gases.

Still another object of this invention is to provide apparatus of the character described which may be adjusted to provide for simultaneous, adjustable rear, downward aft, downward fore right, and downward fore left flow of exhaust from the engine.

A further object of this invention is to provide in apparatus of the character described, sliding deflecting sections having deflectable fins at their forward sides, disposed in the exhaust stream, the arrangement being such that the exhaust stream impinging on said fins may aid in shifting said sections whereby to enable said sections to be controlled at lower power, means being further provided to neutralize the positions of the fins at the ends of the sliding movement of said sections to facilitate stopping the movement of said sections at desired positions.

Yet a further object of this invention is to provide highly improved apparatus of the character described which shall be relatively inexpensive to manufacture, which shall be smooth in operation and yet practical and efficient to a high degree in use.

Other objects of this invention will in part be obvious and in part hereinafter pointed out.

In the accompanying drawing, in which is shown an illustrative embodiment of this invention.

Referring now in detail to the drawing, 10 designates an aircraft or airborne vehicle provided with apparatus 11 employing the invention.

Apparatus 11 comprises an inlet chamber 12 for receiving the exhaust gases from a rocket or jet engine (not shown) mounted in any suitable manner on the aircraft. Chamber 12 comprises a top wall 13, and a bottom wall 14 interconnected by side walls 15, 15a.

Fixed to the rear end of top wall 13 is a guide 17 formed with horizontal, transverse angle shaped slot 18 comprising a vertical upwardly extending portion 19 from the upper end of which extends rearwardly, a horizontal portion 20. Guide 17 is formed with a second, horizontal, transverse angle shaped slot 21 disposed rearwardly of slot 18. Slot 21 comprises a vertical upwardly extending portion 22 from the upper end of which extends rearwardly a horizontal portion 23 disposed at a higher level than slot portion 20 of slot 18.

At the rear end of bottom wall 14 is a horizontal, transverse guide 25 formed with a transverse, horizontal angle shaped slot 26 comprising a downwardly extending vertical slot portion 27 from which there extends rearwardly a horizontal portion 28.

Side walls 15, 15a extend rearwardly beyond top and bottom walls 13, 14. The rear ends of side walls 15, 15a are interconnected by top wall 30 and bottom wall 31 to form a rearward outlet chamber 32 for exhaust gases, disposed directly rearwardly of the inlet chamber 12 but spaced rearwardly therefrom. Between chambers 12 and 32 is a conduit 32a.

At the front end of top wall 30 is a horizontal transverse guide 33 formed with a forwardly opening transverse, horizontal slot 34; provided with a vertical upwardly extending flange 35; with a rearwardly extending transverse, horizontal flange 36 contacting the upper surface of wall 30; and with a shoulder 37 abutted by the forward edge of said top wall.

At the rear end of bottom wall 31 is a horizontal, transverse guide 38 provided with a flange 39 in the plane of said bottom wall, a rearwardly extending flange 40 underlying said bottom wall, and formed with a forwardly opening slot 41.

The portion of side wall 15 between bottom chambers 12 and 32 is formed with a rearwardly and downwardly curved, arcuate, slot 45 substantially 90° in angular extent.

Figure 9:
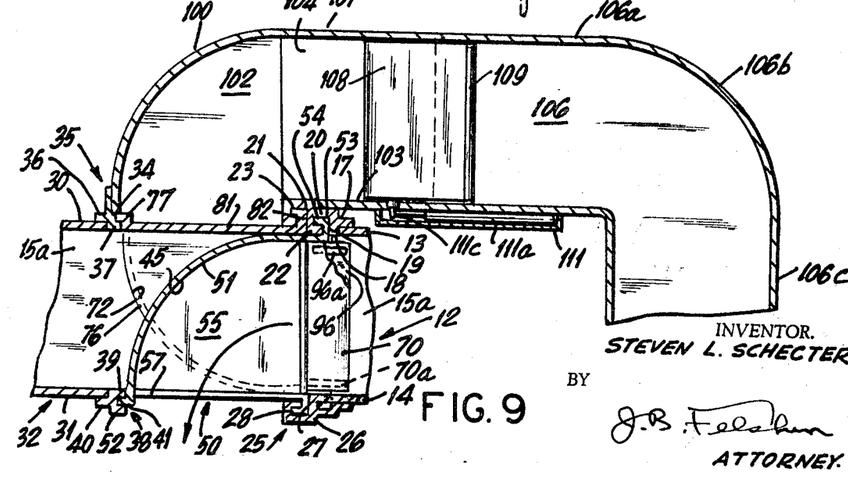
FIG. 9 is a cross-sectional view taken on line 9—9 of FIG. 8.

Slidably mounted on and between chambers 12 and 32, is a control member 50, for deflecting rearwardly moving gases downwardly in the direction of the arrow in FIG. 9. Member 50 comprises a curved, part cylindrical, arcuate wall 51 slidably passing through slot 45 and having at its rear lower end, a rearwardly extending flange 52 slidable endwise in slot 41 of guide member 38. Said curved wall 51 has at its upper forward end, an upwardly extending web 53 passing through slot portion 19 of slot 18. Extending rearwardly from the upper end of web 53, is a flange 54 slidable in slot portion 20 of said slot 18. At the inner end of curved wall 51 is a vertical divider sheet or wall 55 comprising substantially a quarter of a circle and disposed between side walls 15, 15a.

Figure 6:
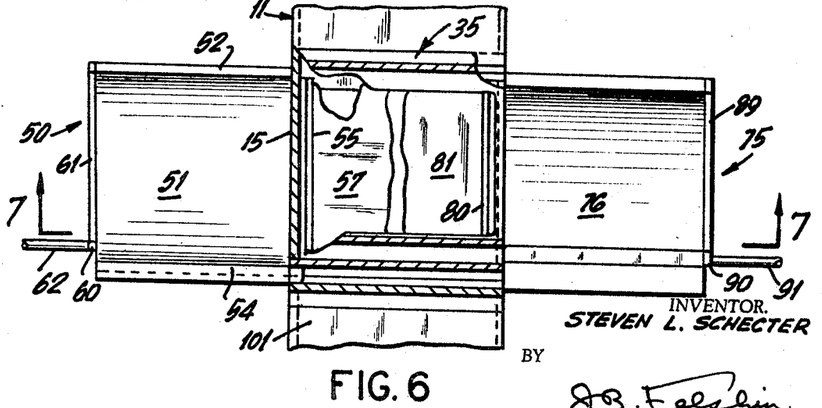
FIG. 6 is a cross-sectional view taken on line 6—6 of FIG. 3.
Figures 7, 8:
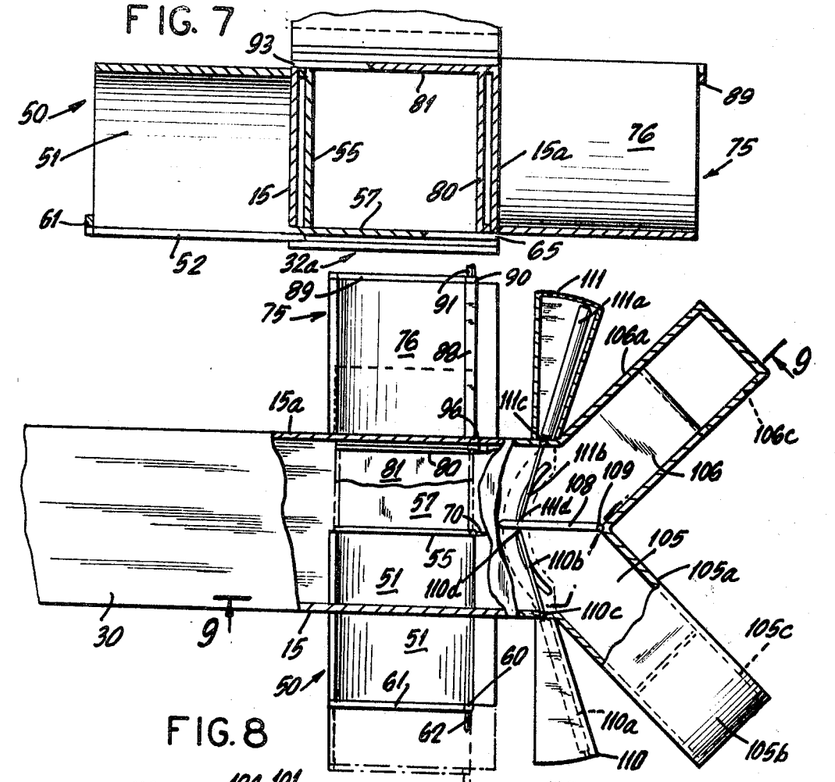
FIG. 7 is a cross-sectional view taken on line 7—7 of FIG. 6.
FIG. 8 is a partial top view of the apparatus with parts broken away and in cross-section.

Fixed with respect to said curved wall 51 and to the lower end of divider wall 55 is a horizontal bottom wall 57 located in the plane of bottom walls 14, 31 and therebetween, and located beyond said vertical divider wall. At the forward end of wall 57 is an angle shaped member 58 slidable in slot 26 and having an extension 59 parallel to flange 52 and coextensive therewith. The outer end of extension 59 is connected to the outer end of guide 53, 54 by a vertical brace 60 and to the outer end of flange 52 by a horizontal brace 61. A horizontal rod 62 fixed to the junction of braces 60, 61 may be pushed and pulled horizontally by any suitable means to adjust the horizontal transverse position of control member 50. When member 50 is pulled all the way out to the position of FIG. 6 and 7, bottom wall 57 closes the gap between bottom walls 14, 31, and curved wall 51 is located outside of the conduit 32a between chambers 12 and 32, so as to allow exhaust gases to pass directly rearwardly from inlet chamber 12 to the outlet chamber 32. Means to be described hereinafter, is provided to close the gap between the top walls 13 and 30. However, when control member 50 is moved to the right, looking at FIGS. 6 and 7, bottom wall 55 moves through a slot 65 in side wall 15a, and curved wall 51 moves through slot 45 in side wall 15, thereby opening up the space between bottom walls 14, 31. When control member 50 is pushed all the way in, the bottom of the conduit 32a between chambers 12 and 32 is open, the deflecting wall 51 is wholly within said conduit, and exhaust gases from chamber 12 are deflected downwardly to provide an aft thrust.

Pivoted to the front edge of divider 55 in any suitable manner is a fin 70.

Figure 1:
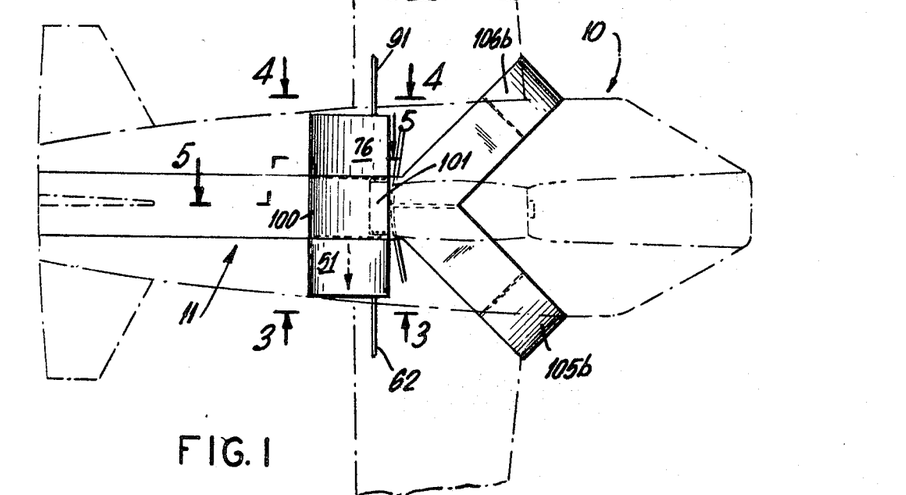
FIG. 1 is a top plan view of apparatus embodying the invention applied to an aircraft, shown in dot-dash lines.
Figure 2:
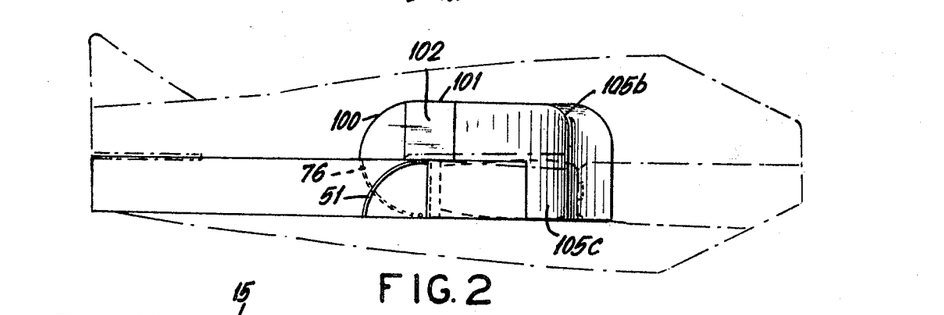
FIG. 2 is a side elevational view of the structure of FIG. 1.
Figure 3:
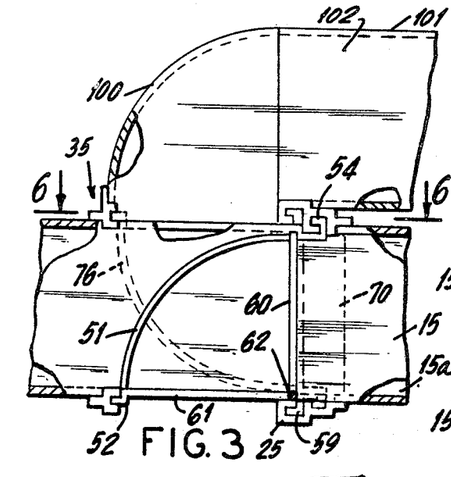
FIG. 3 is an enlarged cross-sectional view taken on line 3—3 of FIG. 1.
Figure 4:
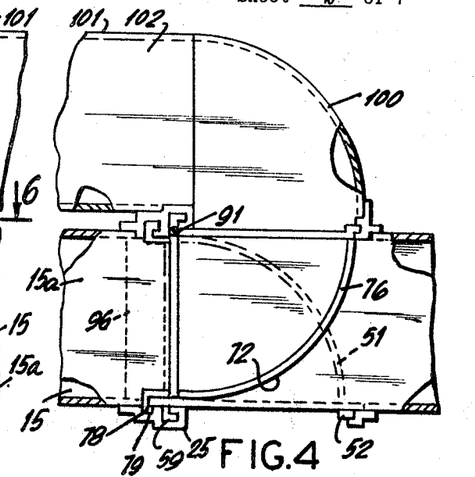
FIG. 4 is an enlarged sectional view taken on line 4—4 of FIG. 1.
Figure 5:
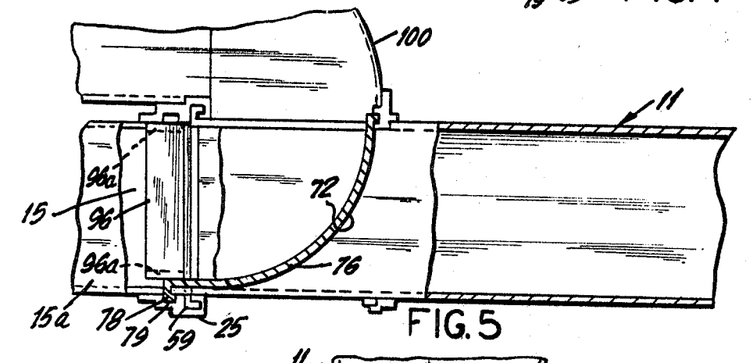
FIG. 5 is an enlarged sectional view taken on line 5—5 of FIG. 1.

Side wall 15a is formed with a rearwardly and upwardly curved slot 72. Slidably mounted on the apparatus, at conduit 32a, between chambers 12 and 32, is a second control member 75 having a curved, part cylindrical wall 76 about 90° in angular extent and slidably passing through said slot 72. At the rear upper end of curved wall 76 is a flange 77 slidable in slot 34. At the lower forward end of curved wall 72 is a guide flange 78 slidable in a slot 79 in guide member 25. The curves of curved members 51, 72, cross each other, as shown in FIG. 4. At the inner end of curved wall 72 is a divider sheet or wall 80 parallel to divider 55 and located between side walls 15, 15a. Fixed to the upper end of divider 80 and to the rear upper end of curved wall 72, is a horizontal wall 81 located in the plane of and between top walls 13, 30. At the rear end of wall 81 is an upwardly offset, rearwardly extending flange which is an extension of flange 77, and is received in slot 34. Wall 81 extends beyond curved wall 76, so that when control member 75 is pulled outwardly to the position of FIG. 7, so that curved wall 76 is outside of wall 15a, the top wall 81 is covering the top of the chamber between chambers 12, 32. It is in this position that the exhaust gases go straight back.

At the front end of wall 81 is an angular flange 82 slidable in angular slot 21. Flange 82 has a horizontal extension 88 parallel to flange 77. The outer end of extension 88 is connected by a longitudinal horizontal brace 89 to the outer end of the upper rear end or flange 77 of curved wall 76. Interconnecting the junction of braces 88, 89 with the outer end of the lower front edge of curved wall 76, is a vertical brace 90. A horizontal rod 91 fixed to the junction of braces 88, 89 and 90, is pushed or pulled horizontally by any suitable means to adjust the position of control member 75. Thus if both control members 50 and 75 are pulled out, exhaust gases will go straight back.

If control member 50 is pulled all the way out, but control member 75 is pushed inwardly, then the deflecting wall 76 will deflect exhaust gases upwardly and the top wall 81 will have moved through a horizontal slot 93 in side wall 15 to uncover the top of the conduit between chambers 12 and 32. Pivoted to the front end edge of divider 80 is a fin 96. If both control members are pushed partially toward each other, some of the exhaust gases will be deflected downwardly and some upwardly.

Figure 10A:
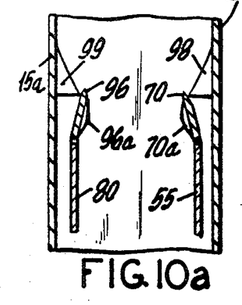
FIGS. 10a, 10b, 10c and 10d are horizontal cross-sectional views through the divider sheets and showing the divider sheets and their fins in various relative positions of said divider sheets, from spread apart position to close together position.
Figure 10B:
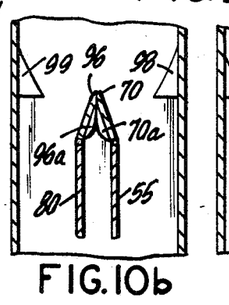
Figure 10C:
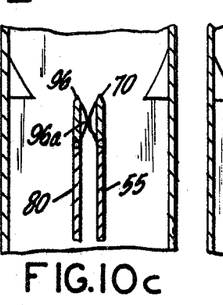
Figure 10D:
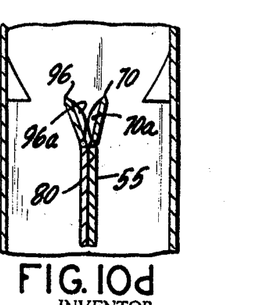
Figure 11:
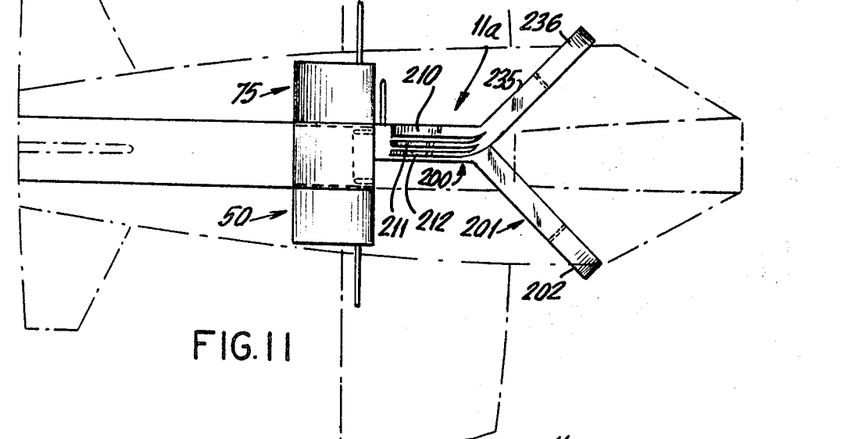
FIG. 11 is a top plan view of an airborne vehicle provided with apparatus embodying a modified form of the invention and showing the vehicle in dot-dash lines.
Figure 12:
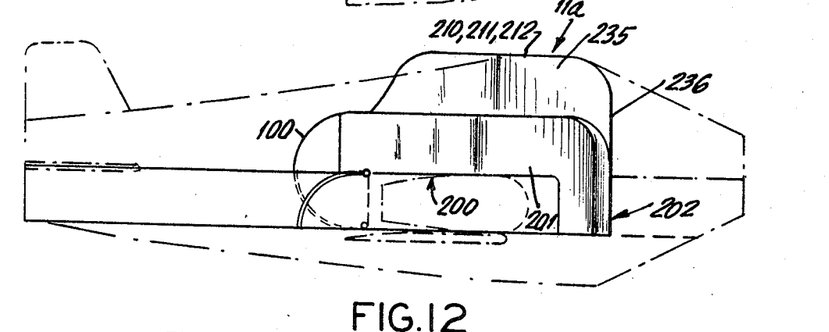
FIG. 12 is a side elevational view of the structure shown in FIG. 11.

At the inner sides or side walls 15, 15a are abutments 98, 99 to be contacted by the fins 70, 96 respectively when the dividers move outwardly away from each other, to thereby swing the fins inwardly toward each other as seen in FIG. 10a, to positions inclined inwardly relative to their dividers. Should a divider move from said position of FIG. 10a, then the inclination of the fin, will aid in transverse movement of the divider, and hence its control member toward an opposite side wall. Said fins 70 and 96 have curved projections 70a, 96a, respectively, at their inner sides. As the dividers 55, 80 move together, as illustrated in FIGS. 10b, 10c, 10d, the curved portions 70a, 96a of the fins contact each other to tilt the fins outwardly relative to said dividers, as shown in FIG. 10a. Thereafter, movement of the control members 50, 75 outwardly is aided by the gases impinging on the inner curved sides of said fins.

Means is provided to cause gases deflected upwardly by deflecting curved wall 76, to exit from the aircraft fore right and fore left. To this end there is fixed to guide 35, an upwardly and forwardly curved wall 100. Extending from the upper end of wall 100 is a top horizontal wall 101. At the sides of walls 100, 101 are side walls 102. Fixed to guide 17 is a bottom wall 103 interconnecting the lower ends of side walls 102. Walls 100, 101, 102, 103 form a forwardly extending conduit or passageway 104 for upwardly deflected gases. This passage is divided into passages 105, 106 by chambers 105a, 106a respectively, which incline right and left in a horizontal plane, then bend downwardly at 105b, 106b and then extend downwardly as at 105c, 106c, to provide downwardly opening outlets right fore and left fore.

Within passageway 104 at the junction of said passageway with passages 105, 106, is a valve blade 108 pivoted as at 109 on a vertical axis, and projecting forwardly and disposed in a vertical plane. When said valve blade is projecting straight back the exhaust gases are equally divided fore right and fore left. Means is provided to adjust the angular position of said valve blade 108. To this end chambers 110 and 111 extend from chamber 101 to opposite sides thereof. Hydraulic cylinders 110a, 111a within chambers 110, 111, respectively, control push rods 110b, 111b, respectively. Cylinders 110a, 111a are hinged as at 110c, 111c, for swinging movement about vertical axes. The inner ends of rods 110b, 110b are hinged as at 110d, 111d, respectively, to opposite sides of blade 108. Hydraulic controls of any suitable kind for the cylinders 110a, 111a will adjust the position of the blade 108 so as to control the relative flow of exhaust gases right fore downwardly and left fore downwardly.

Thus the apparatus herein may be controlled to cause exhaust gases to either move only straight back, or to flow only down aft, or to flow down aft and fore right down and fore left down and down aft simultaneously.

It will be understood that three point exhaust, discharge for vertical take off, lift and landing may be changed to straight and level flight for single engine aircraft. Also, the right control member 50 alone may be employed for multiple engine craft, in which case there is one control member for each engine.

In FIGS. 11–16 there is shown apparatus 11a embodying the invention and illustrating a modified form thereof. In apparatus 11a the exhaust gases from the engine pass through an inlet chamber 12 similar to inlet chamber 12 of apparatus 11. Control member 50 of apparatus 11a, for deflecting exhaust gases downwardly or for permitting the exhaust gases to move rearwardly to chamber 32 is the same as in apparatus 11. The control member 50 moves through a curved slot 45 as in apparatus 11.

The means for deflecting exhaust gases upwardly including the control member 75 passing through curved slot 72 are also the same as in apparatus 11. Furthermore, the control members 50 and 75 are the same as in apparatus 11. The control member 50 has a horizontal plate 57 to prevent exhaust gases from moving downwardly when said control member is in its outward, non-operative position. Also, control member 75 has a top wall 81 to prevent exhaust gases from moving upwardly when the control member 75 is in its outward, non-operative position as in apparatus 11.

Apparatus 11a also has an upwardly and forwardly curved wall 100 to deflect exhaust gases which pass upwardly, in a forward direction, also as in apparatus 11. However, in apparatus 11a exhaust gases passing through chamber 102 beneath curved wall 100, move forwardly through a horizontal duct 200 extending forwardly and from which a duct 201 extends to the right at an angle. Extending from the duct 201, downwardly therefrom, is a duct 202 having an outlet at its lower end. In ducts 200, 201 and 202 are longitudinal vertical partitions 203, 204 and 205 forming passageways 206, 207, 208 and 209. Extending upwardly from the duct 200 are ducts 210, 211 and 212. The duct 210 is formed with vertical partitions 215 and 216 dividing said duct into passageways 217 and 218. The passageways 217 and 218 communicate with the duct 200. The partition 216 unites with the outer wall 219 of ducts 200, 201 and 202. Duct 210 has an outer wall 220 and an inner wall 221. The inner wall 221 merges with the partition 216 and outer wall 219 of the ducts 200, 201 and 202 have an outer wall 222. The duct 211 comprises an outer wall 224 which enters the duct 200 and becomes a partition 225. Duct 211 further comprises a wall 226 which enters the duct 200 and becomes a partition 227. Between partitions 225 and 227 is formed a passageway 228 which passes upwardly to the duct 211 and merges with the duct 212. The duct 212 comprises a partition 229 which moves upwardly above the duct 200 to form an outer wall 231. Said duct 212 further comprises a wall 232 which enters the duct 200 and becomes a partition 233 forming with partition 229, a passageway 234. The duct 212 merges with the duct 211. The ducts 210, 211 and 212 are joined together and extend outwardly at an inclination to the left, as at 235, and extending downwardly from the duct 235 is duct 236 having an outlet at its lower end.

Partition 215 moves through the ducts 235 and 236. The walls 221 and 227 merge into a partition 239. The wall 224 and partition 229 merge into a partition 240. The partitions 215, 239 and 240 extend through the ducts 235 and 236 to divide said ducts into the passageways 217, 218, 228 and 234. Between partitions 216 and 227 is an extension of the partition 205 forming extensions of the passageways 209 and 208. The partitions 229 and 223 merge to form the partition 203. Between partition 223 and outer wall 222 is passageway 240a which is an extension of the passageway 206. Between partitions 225 and 229 is a passageway 241 which merges with the passageway 207. It will now be understood that when exhaust gases rise in chamber 101, those exhaust gases will always pass through passageway 240 to passageway 206, into the ducts 201, 202; through passageway 234 to the ducts 235 and 236; to the passageway 241 to the passageway 207 in the ducts 201 and 202; and to passageway 228 to ducts 235 and 236.

Means is provided to control the passage of exhaust gases to passageways 218, 219, 209 and 208. To this end there is pivoted within the duct 202 on vertical axles 250, 251, a pair of valve members 252, 253, respectively. These valve members are interconnected by a link 255. Axle 250 may be attached to an operating rotary crank 257 which may be controlled in any suitable manner. In end of partition 215, and valve 253 extends to the leading end of partition 205. In such position exhaust gases can pass only to passageways 218 and 209 but not to passageways 217 or 208.

Figures 13, 13A, 13B:
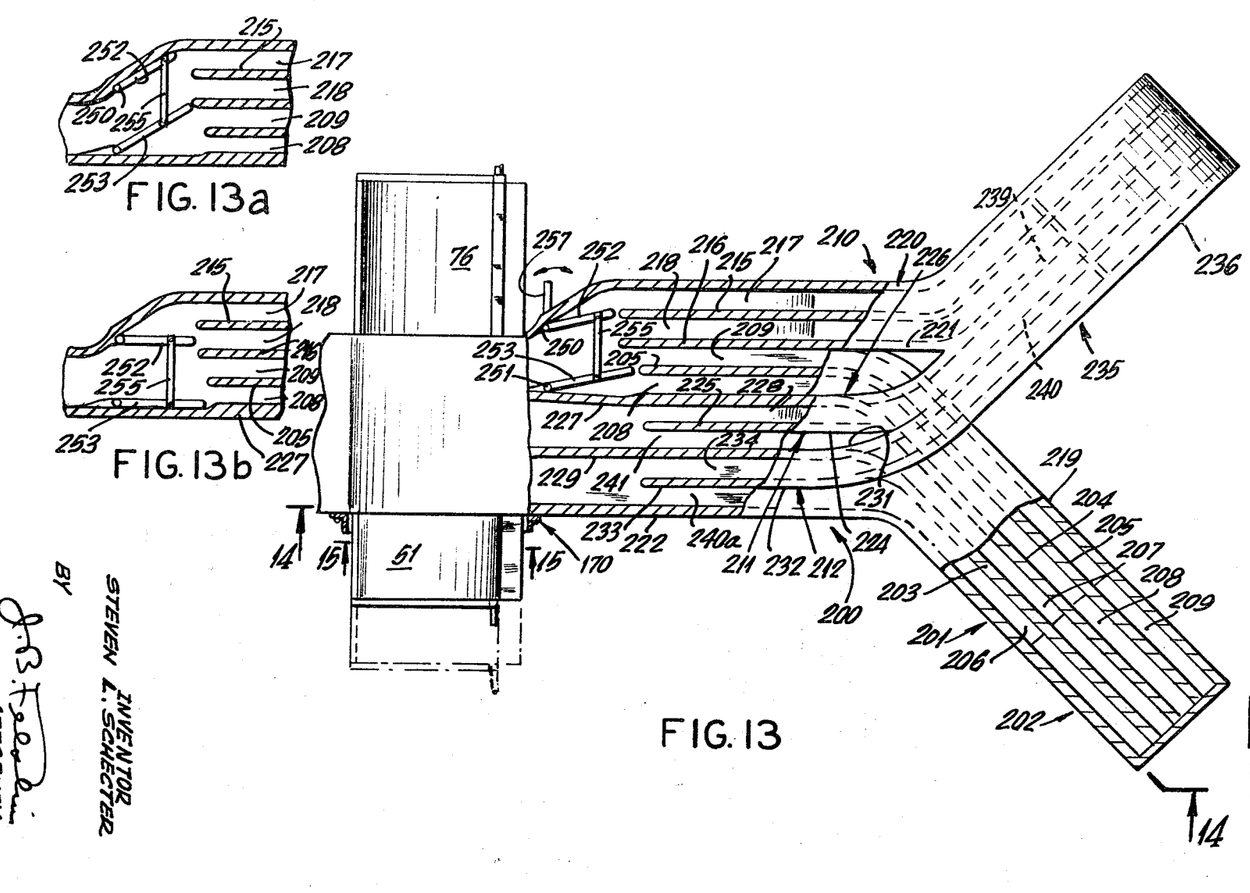
FIG. 13 is a partial top plan view of the structure shown in FIG. 11, with parts broken away and in cross-section.
FIG. 13a is a partial view of the structure shown in FIG. 13 showing the control means in a position other than that shown in FIG. 13.
FIG. 13b is a view similar to FIG. 13a but showing the control means in still another position.
Figure 14:
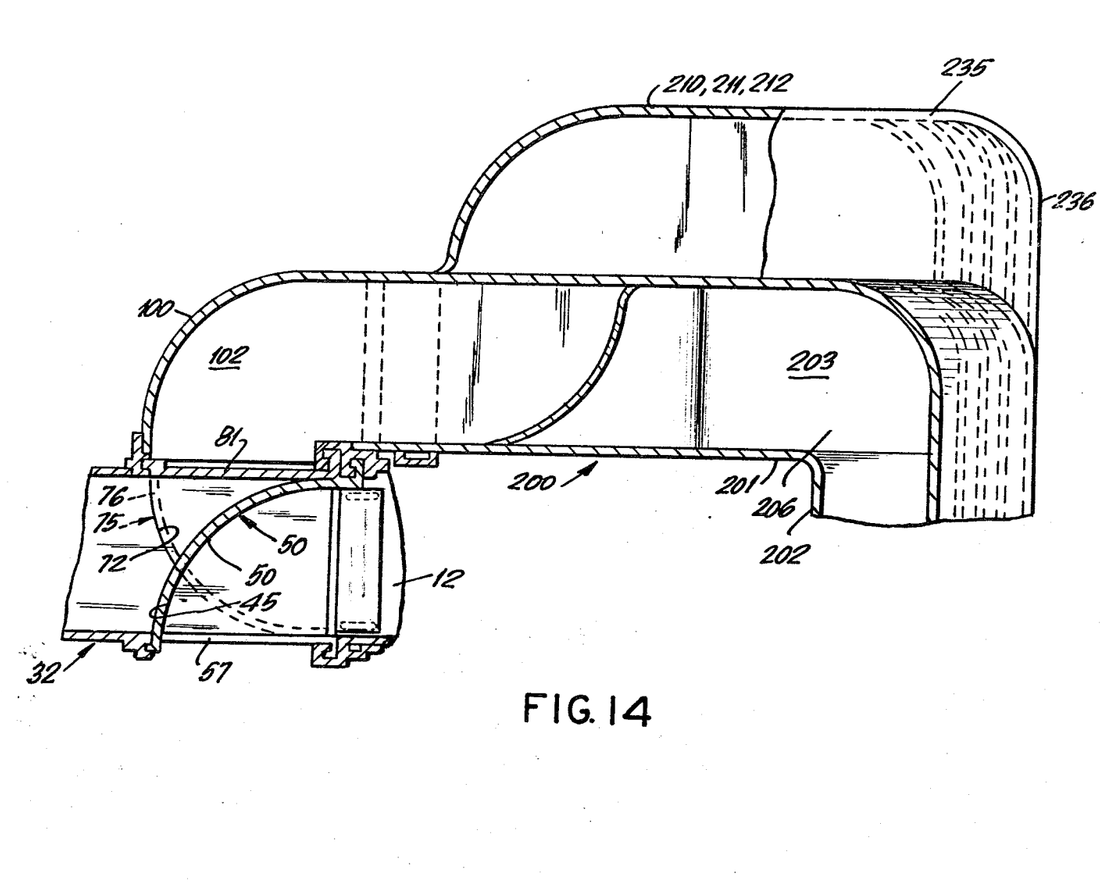
FIG. 14 is a cross-sectional view taken on lines 14—14 of FIG. 13.

In FIG. 13a the valve members 252 and 253 are moved to a position where exhaust gases pass to the passageways 217 and 218 but not to passageways 209 and 208.

In the position shown in FIG. 13b, valve member 250 extends to the leading end of partition 216. Valve 253 lies flat against the partition 227. In such position, the exhaust gases pass to the passageways 209 and 208, but not to the passageways 217 and 218. Thus when exhaust gases are deflected upwardly to chamber 102 they will always pass to passageways 206 and 207 and to passageways 228 and 241 for even distribution of gases fore right and left. Control may be had with respect to the passage of exhaust gases to passageways 217, 218, 209 and 208 by means of said control member 250.

Means is provided to prevent seepage of exhaust gases through the slots 45 and 72 of either apparatus 11 or 11a. To this end gaskets 160 may be attached to opposite sides of walls 15 and 15a in the chamber between the bottom chambers 12 and 32 through which the curved members 51 and 76 pass. These gaskets contact the curved members to prevent seepage. Another precaution to prevent seepage may be in the form of a casing 170, curved in cross-section which is attached to the side walls 15 and 15a and into which the curved walls 51 and 76 slide. The casings 170 extend in opposite directions and follow the curvature of the curved walls 51 and 76. The gaskets 160 and the enclosing casings 170 may be applied to the curved walls 51 and 76 of the control members 50 and 75 of apparatus 11, as well as to apparatus 11a.

Figure 15:
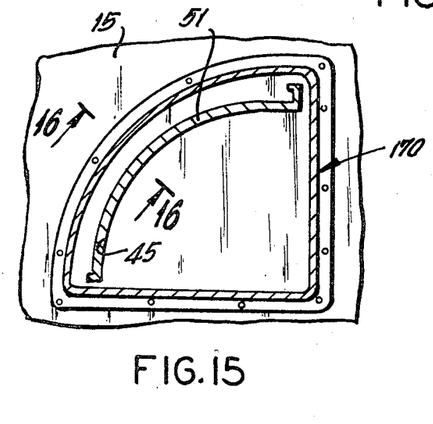
FIG. 15 is a cross-sectional view taken on lines 15—15 of FIG. 13.
Figure 16:
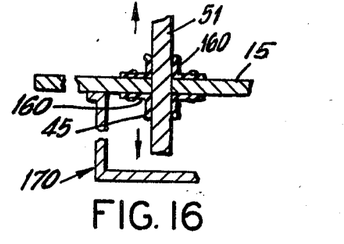
FIG. 16 is a cross-sectional view taken on lines 16—16 of FIG. 15.
Figure 17:
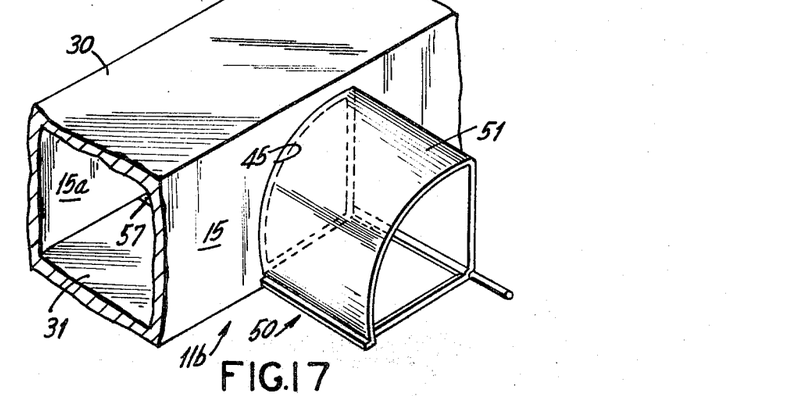
FIG. 17 is a partial perspective view showing a construction in which exhaust gases are downwardly deflected to only one point aft of the engine.

In FIG. 17 there is shown apparatus 11b embodying the invention in which only the control member 50 is employed to deflect gases downwardly only, and control member 75 is eliminated. The control member 50 may be the same as in apparatus 11. It will only either deflect gases downwardly or let gases move rearwardly. The control member 50 may be provided with a gasket 150 and with an enclosed casing 170 as shown in FIGS. 15 and 16. The chambers 12 and 32 are connected by unbroken side and top walls and only the bottom wall has an opening through which exhaust gases are deflected downwardly.

Figure 18:
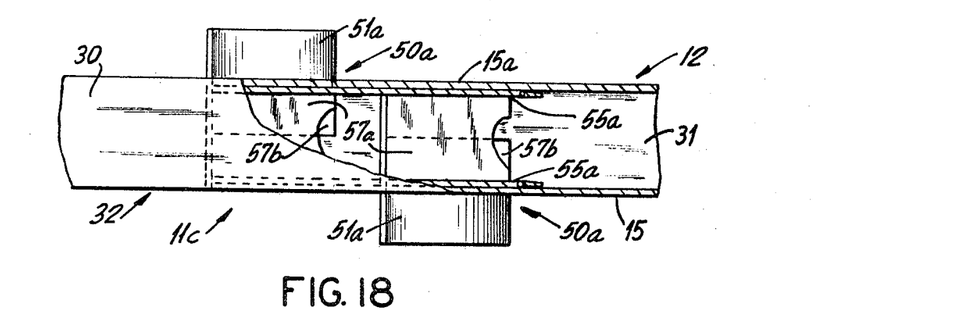
FIG. 18 is a top plan view showing a construction in which exhaust gases are downwardly deflected to two thrust points aft of the engine.
Figure 19:
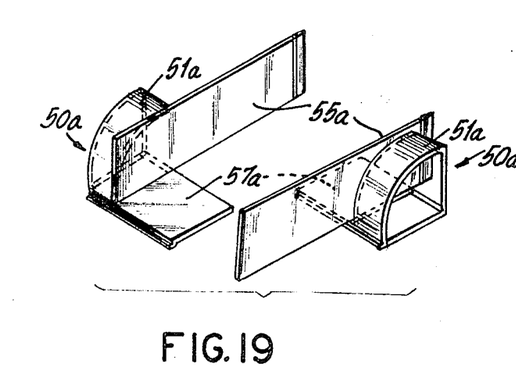
FIG. 19 is a perspective exploded view showing the two control members of FIG. 18 apart from the conduit.
Figure 20:
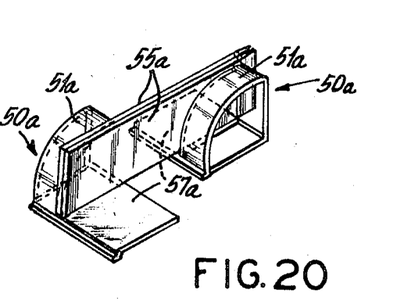
FIG. 20 is a perspective view of the control members of FIG. 18 pushed together for deflecting the exhaust gases downwardly.

In FIGS. 18, 19 and 20 there is shown apparatus 11c similar to apparatus 11b except two control members 50a are used. These control members 50a are substantially similar and symmetrical with respect to each other and each comprising a curved member 51a which is slightly more than one half the width of the conduit between chambers 12 and 32. Each control member 50a has a flat horizontal wall 57a connected to curved wall 51a. At the end of each curved wall 51a is a flat vertical wall 55a. The transverse lengths of curved walls 51a and flat walls 57a are equal, the latter being equal to the transverse width of the conduit. Walls 55a are parallel and cotensive, but one curved wall 51a and its flat wall 57a are forward of the other. When members 50a are slidably moved toward each other, flat walls 55a will contact and curved members 51a will both be disposed between the side walls of the conduit between chambers 12 and 32, and together will deflect all the gases downwardly. When the control members 50a are moved out, walls 57a will together cover the openings in the bottom of the conduit so that exhaust gases go directly rearwardly. When curved members 51a are pushed into the conduit, flat members 57a will project from the conduit to opposite sides thereof thus uncovering the openings in the bottom of the conduit. With such construction the curved walls 51a of control members 50a are of less horizontal length. Each has a length equal to slightly more than half the width of said conduit. They are shown in FIG. 18 when moved out of the conduit. In such position openings 57b in the bottom wall of the conduit are covered. These openings 57b are exposed when the control members 50a are pushed together as shown in FIG. 20, in which position, said openings are directly beneath curved walls 51a.

Otherwise members 50a are substantially similar in construction to member 50 of apparatus 11 or 11a or 11b. The control members 50a may also be provided with gaskets 160 and casing 170 to prevent seepage as in FIGS. 15 and 16.

Suitable means is provided for moving the control members of FIGS. 17 and 18 and these moving means may pass through the casings 170.

The controls of FIGS. 17 and 18 are used for multiple engine aircraft. The apparatus of FIG. 18, when coupled to each engine of a twin-engine aircraft, in which the engines are situated side by side, provide downward deflected thrust at four points—two per engine. The apparatus of FIG. 17 or FIG. 18, when coupled to each engine of a tri-or-more-engine aircraft, in which one or more engines are situated fore of the other engines, provide deflected thrust at three or more points. Since stable operation of VTOL aircraft requires three or more downward thrust points, the apparatus thus are effective.

It will thus be seen that there is provided an apparatus and article in which the several objects of this invention are achieved, and which is well adapted to meet the conditions of practical use.

I claim:

1. In combination, an aircraft, means on said aircraft to receive exhaust gases from an engine on said aircraft, means to outlet flow said exhaust gases straight rearwardly for straight and level flight, and means to cause said exhaust gases to be deflected to outlet flow downwardly instead of straight rearwardly, for vertical takeoff and landing, said exhaust gases receiving means and said means to outlet flow said gases straight rearwardly being interconnected by a conduit, and said deflecting means comprising a control means provided with a downwardly and rearwardly curved wall movable into and out of the said conduit, and means movable with said curved wall to close an opening formed in the bottom of the conduit when said curved wall is outside said conduit and to uncover said opening in the bottom of said conduit when said curved wall is within said conduit and said conduit having a side wall formed with a curved slot through which said curved wall slides.

2. The combination of claim 1, and means to move said control means transversely of said conduit.

3. The combination of claim 2, and cooperating guide means on said control means and conduit, to slidably mount said control means on said conduit.

4. In combination, an aircraft, means on said aircraft to receive exhaust gases from an engine on said aircraft, means to outlet flow said exhaust gases straight rearwardly for straight and level flight, and means to cause said exhaust gases to be deflected to outlet flow downwardly instead of straight rearwardly, for vertical takeoff and landing, and means to cause exhaust to be deflected to outlet downwardly right and left fore relative to said first mentioned downward deflection whereby said first mentioned downward outlet flow of exhaust gases is located aft relative to the engine to which the means are coupled, said means to deflect gases fore right and left being operable concurrently with the operation of said means to deflect gases downwardly aft.

5. The combination of claim 4, said first and second deflecting means including a pair of control members, said exhaust gases receiving means and said means to outlet flow gases straight rearwardly being interconnected by a conduit, one of said control members having a rearwardly and downwardly curved wall movable into and out of said conduit, and means on said first control member to cover the bottom of said conduit when said curved wall is outside said conduit and to uncover said bottom of said conduit when said curved wall is within said conduit, and said other control member comprising an upwardly and rearwardly curved wall movable into and out of said conduit, and means on said other control member to cover the top of said conduit when said curved wall of said other control member is outside of said conduit and to uncover the top of said conduit when said curved wall of said second control member is within said conduit.

6. The combination of claim 5, said control members each having a divider wall disposed between the sides of said conduit and located at the inner end of its curved wall.

7. The combination of claim 5, and said conduit having side walls formed with slots through which said curved walls slide.

8. The combination of claim 6, said divider walls having forward edges and fins hinged to said forward edges.

9. The combination of claim 8, and means to cause rotation of said hinged fins when said divider walls move away from each other.

10. In combination, an aircraft, means on said aircraft to receive exhaust gases from an engine on said aircraft, means to outlet flow said exhaust gases straight rearwardly for straight and level flight, and means to cause said exhaust gases to be deflected to outlet flow downwardly instead of straight rearwardly, for vertical takeoff and landing, said exhaust gases receiving means and said means to outlet flow said gases straight rearwardly being interconnected by a conduit, and said deflecting means comprising a pair of aligned, similar, symmetrically disposed control means provided with downwardly and rearwardly curved walls movable into and out of said conduit transversely thereof, and means movable with said curved walls to close an opening formed in the bottom of said conduit when said curved walls are outside of said conduit, and to uncover said opening in said bottom of said conduit when said curved walls are within said conduit, and said conduit having side walls formed with curved slots through which said curved walls slide.

11. The combination of claim 5, a passageway communicating with the top of said conduit and extending forwardly, and passages communicating with said passageway and extending to the right and left forwardly, and opening downwardly.

12. The combination of claim 11, and means to regulate flow of gases from said passageway to said passages.

13. The combintaion of claim 1, and means to prevent seepage of exhaust gases through said slot to the outside of said aircraft.

14. The combination of claim 4, said means to cause exhaust gases to be deflected to outlet flow downwardly right and left fore, comprising ducts provided with partitions dividing said ducts into separate passageways.

15. The combination of claim 14, and means to control the flow of exhaust gases to selected ones of said passageways.

References Cited

UNITED STATES PATENTS

| | | | |
|---|---|---|---|
| 3,117,750 | 1/1964 | Snell | 244—52 X |
| 3,126,171 | 3/1964 | Steniewski et al. | 244—52 X |
| 3,190,584 | 6/1965 | Gire et al. | 244—52 |
| 3,193,217 | 7/1965 | Marchant et al. | 244—52 X |
| 3,284,029 | 11/1966 | Kaminski et al. | 244—52 |

FOREIGN PATENTS

| | | |
|---|---|---|
| 1,100,385 | 2/1961 | Germany. |

MILTON BUCHLER, *Primary Examiner.*

J. PITTENGER, *Assistant Examiner.*

U.S. Cl. X.R.

60—229; 239—265.29